US006984192B2

(12) United States Patent
Markyvech

(10) Patent No.: US 6,984,192 B2
(45) Date of Patent: Jan. 10, 2006

(54) THROTTLE RAMP RATE CONTROL SYSTEM FOR A VEHICLE

(75) Inventor: Ronald K. Markyvech, Allen Park, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/285,888

(22) Filed: Nov. 1, 2002

(65) Prior Publication Data

US 2004/0087414 A1 May 6, 2004

(51) Int. Cl.
*B60K 41/02* (2006.01)

(52) U.S. Cl. .......................... 477/181; 477/90; 477/107

(58) Field of Classification Search ................. 477/900, 477/181, 90, 107
See application file for complete search history.

(56) References Cited

U.S. PATENT DOCUMENTS

| | | | | | |
|---|---|---|---|---|---|
| 4,181,103 | A | * | 1/1980 | Sturdy | 123/320 |
| 5,021,958 | A | * | 6/1991 | Tokoro | 701/98 |
| 5,510,982 | A | * | 4/1996 | Ohnishi et al. | 701/55 |
| 6,029,107 | A | * | 2/2000 | Sato | 701/58 |
| 6,116,105 | A | * | 9/2000 | Genise et al. | 74/335 |
| 6,205,389 | B1 | * | 3/2001 | Genise | 701/51 |
| 6,394,931 | B1 | * | 5/2002 | Genise | 477/97 |
| 6,436,005 | B1 | * | 8/2002 | Bellinger | 477/111 |
| 6,558,294 | B1 | * | 5/2003 | Stafner | 477/120 |
| 2002/0103056 | A1 | * | 8/2002 | Ishiguro et al. | 477/120 |
| 2002/0107106 | A1 | * | 8/2002 | Kato et al. | 477/110 |

* cited by examiner

*Primary Examiner*—Ha Ho
(74) *Attorney, Agent, or Firm*—Rader, Fishman & Grauer PLLC

(57) ABSTRACT

A system and method for controlling a throttle ramp rate of a vehicle. According to an embodiment of the invention, the controlling of a throttle ramp rate of a vehicle is accomplished by determining the target engine speed for a vehicle during a vehicle launch. If it is determined that there is a high throttle demand upon the engine of the vehicle, a throttle ramp rate offset amount is determined, which is based upon an estimated weight of the vehicle. A default high throttle ramp rate may then be adjusted based upon the determined throttle ramp rate offset.

9 Claims, 5 Drawing Sheets

THROTTLE RAMP RATE CONTROL SYSTEM FOR A VEHICLE

FIELD OF THE INVENTION

The present invention relates to a system and method for controlling a prime mover of a vehicle, and, more specifically, a system and method for controlling the throttle ramp rate of a prime mover during the launch of a vehicle.

BACKGROUND OF THE INVENTION

During the launch of a motor vehicle, the vehicle operator adjusts a throttle of the vehicle, typically by depressing an accelerator pedal, in order to increase the running speed of the engine. Increasing the engine speed increases the amount of torque generated by the engine, which subsequently causes the wheels to turn. The rate at which the speed of the engine can be increased is known as the throttle ramp rate. In some vehicles, only one or two throttle ramp rates may be available, such as a low throttle ramp rate for when a desired engine speed is relatively low, and a high throttle ramp rate for when a desired engine speed is relatively high. Furthermore, these throttle ramp rates may be constant in value. FIG. 1 is a graph of engine speed over time, and depicts a constant throttle ramp rate as used in the prior art.

A constant value high throttle ramp rate is sufficient for vehicles that maintain a uniform weight. However, for vehicles such as commercial trucks, the effective vehicle weight can vary drastically depending on the type and amount of cargo being carried. As a result, one constant high throttle ramp rate is inadequate, as it often leads to excessive acceleration of the engine when the vehicle is light, resulting in jerky starts, or insufficient acceleration of the engine when the vehicle is heavy, resulting in a slow and labored launch of the vehicle.

SUMMARY OF THE INVENTION

The present invention, according to one embodiment, includes a system and method of controlling the fueling of an engine during a vehicle launch. The system and method accomplish this by determining a target engine speed, along with determining whether there is a high throttle demand upon the engine. The default high throttle ramp rate can then be adjusted according to a calculated amount of offset that is based upon an estimated weight of the vehicle.

DESCRIPTION OF THE PREFERRED EMBODIMENT

Figure 1:
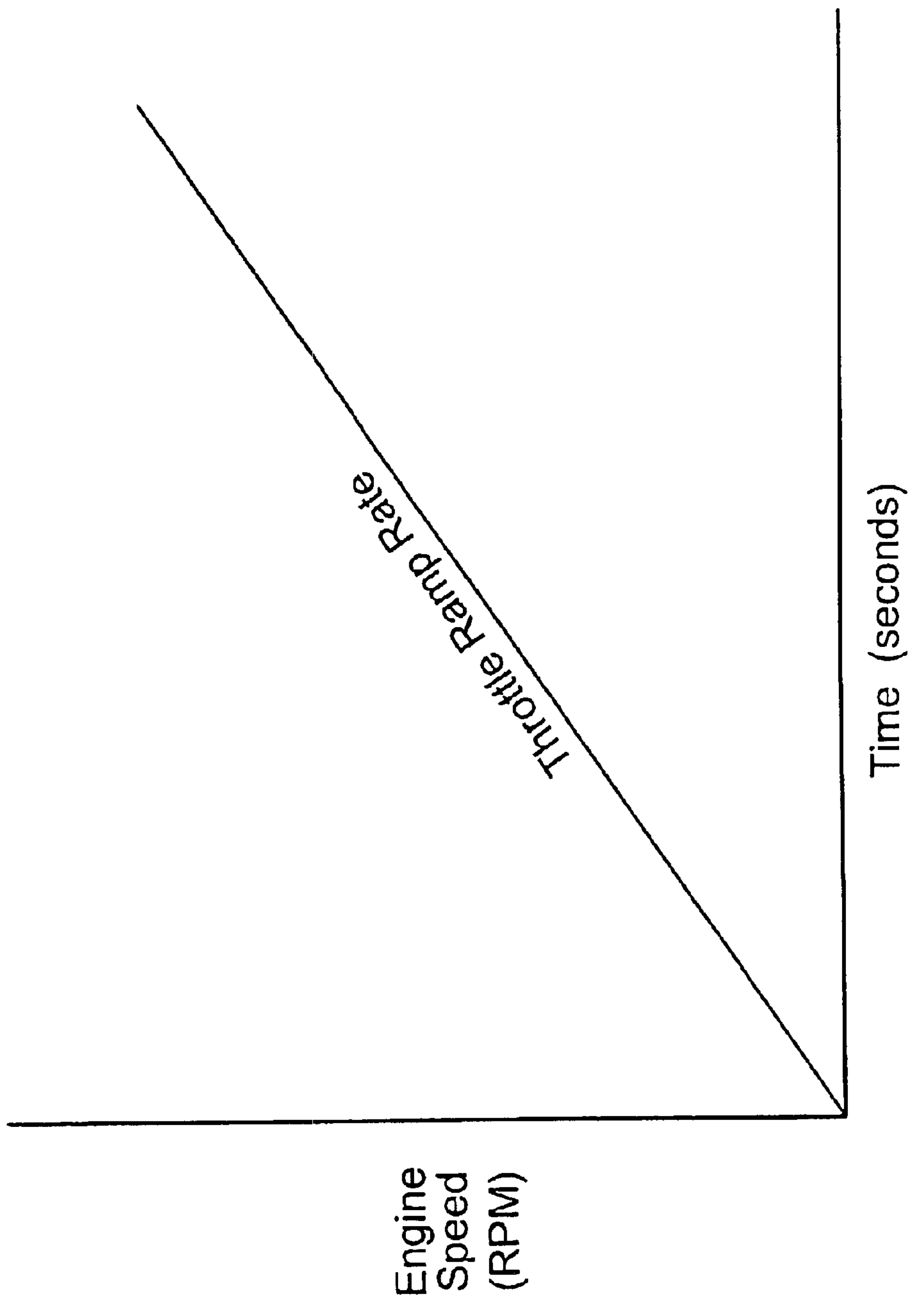
PRIOR ART FIG. 1
FIG. 1 is a graph depicting a typical throttle ramp rate of a conventional vehicle.
Figure 2:
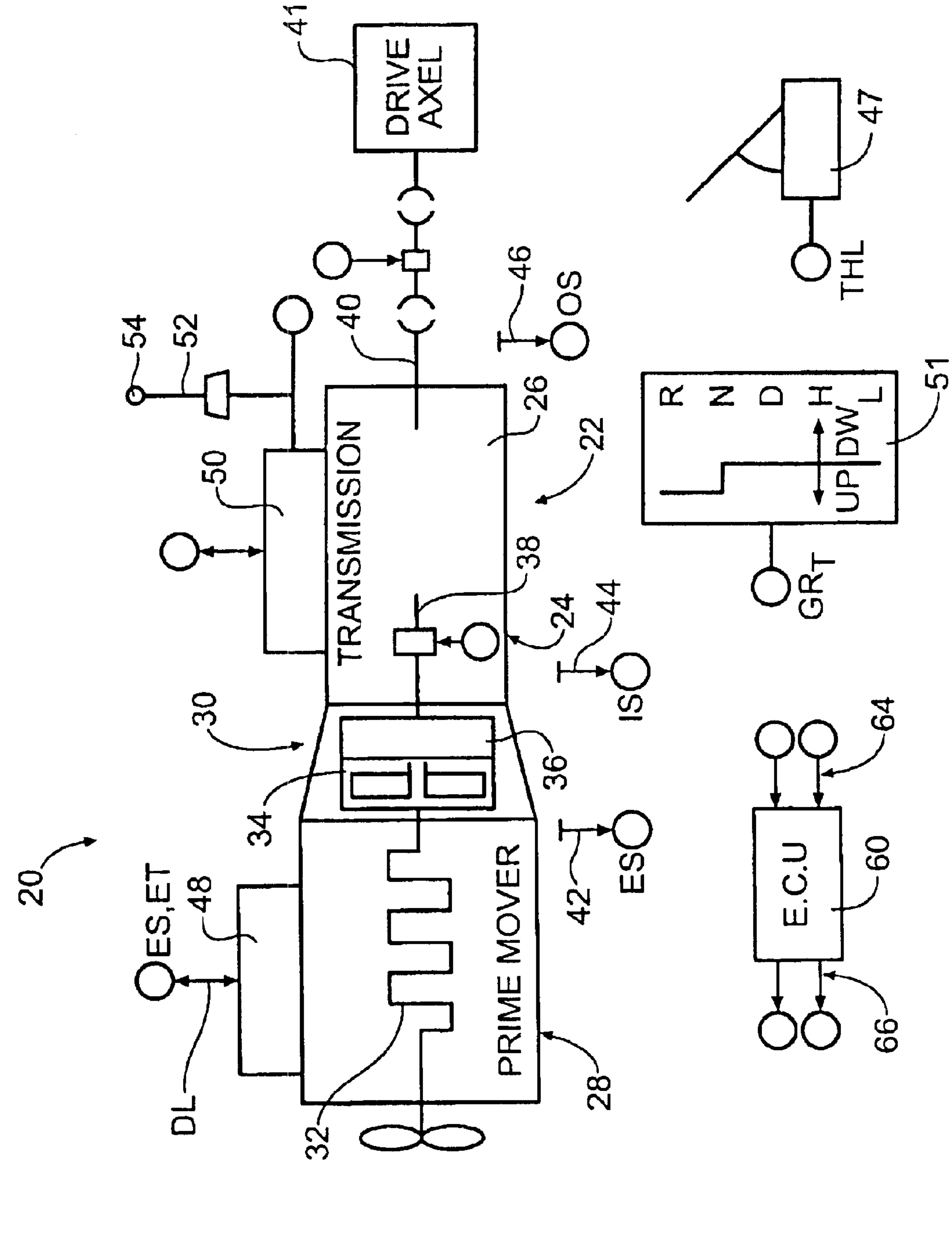
FIG. 2 is a simplified schematic illustration of an exemplary or illustrative vehicle drive-train system that incorporates the throttle ramp rate control system according to an embodiment of the invention.

FIG. 2 is a schematic illustration of an exemplary vehicle drive-train system 20 that incorporates a throttle ramp rate control system according to an embodiment of the present invention. In system 20, a multi-gear transmission 22 having a main transmission section 24, which may or may not be connected in series with a splitter-type auxiliary transmission section 26, is drivingly connected to a prime mover 28 by clutch 30. Prime mover 28 can be one of many different types, including, but not limited to, a heat engine, electric motor, or hybrid thereof. For illustrative purposes, prime mover 28 will be presumed to be an internal combustion engine 28 for the remainder of this discussion.

Engine 28 includes a crankshaft 32, which is attached to an input member 34 of clutch 30. Clutch 30 can be any type of clutch system, although in practice, will likely be of the type commonly utilized in vehicle drive-trains, such as, for example, frictional clutches including centrifugal clutches or position controlled clutches. For the remainder of the discussion, clutch 30 will be assumed to be a centrifugal friction clutch.

Input member 34 of centrifugal friction clutch 30 frictionally engages with, and disengages from, an output member 36, which is attached to an input shaft 38 of transmission 22. The clamping force and torque transfer capacity of centrifugal friction clutch 30 is a function of the rotational speed (ES) of the engine 28 and clutch input member 34.

Vehicle drive-train 20 also includes at least one rotational speed sensor 42 for sensing engine rotational speed (ES), sensor 44 for sensing input shaft rotational speed (IS), and sensor 46 for sensing output shaft rotational speed (OS), and providing signals indicative thereof. The engaged and disengaged states of clutch 30 may be sensed by a position sensor, or alternatively, determined by comparing the speed of the engine (ES) to the speed of the input shaft (IS). A sensor 47 is also provided for sensing a throttle pedal operating parameter, such as throttle position, and providing an output signal (THL) indicative thereof.

The terms "engaged" and "disengaged" as used in connection with clutch 30 refer to the capacity, or lack of capacity, respectively, of the clutch 30 to transfer a significant amount of torque. Mere random contact of the friction surfaces, in the absence of at least a minimal clamping force, is not considered engagement.

Engine 28 may be electronically controlled by an electronic controller 48 that is capable of communicating with other vehicle components over an electronic data link (DL) operating under an industry standard protocol such as SAE J-1922, SAE J-1939, ISO 11898 or the like. Engine controller 48 includes an output for selectively transmitting a command signal to engine 28, while engine 28 includes an input that selectively receives the command signal from engine controller 48. Engine controller 48 further includes at least one mode of operation for controlling engine fuelling, thereby controlling the engine speed (ES) of engine 28

A shift actuator 50 may be provided for automated or semi-automated shifting of the transmission main section 24 and/or auxiliary section 26. A shift selector 51 allows the vehicle driver to select a mode of operation and provide a signal $GR_T$ indicative thereof. One example of such a transmission system is the AutoShift™ series of transmission systems by Eaton® Corporation. Alternatively, a manually operated shift lever 52 having a shift knob 54 thereon may be provided, which is manually manipulated in a known shift pattern for selective engagement and disengagement of various shift ratios.

System 20 further includes a control unit 60, and more preferably an electronic control unit (ECU), such as a microprocessor-based electronic control unit that communicates by one or more data links. ECU 60 may receive input signals 64 from sensors 42, 44 and 46 and processes the signals according to predetermined logic rules to issue command output signals 66 to system actuators, such as engine controller 48, shift actuator 50, and the like. Alternatively, one or more signals from sensors 42, 44 and 46 may be directed to engine controller 48, which may then supply ECU 60 with the necessary data. Then, through communication over a data link, ECU 60 can work with engine controller 48 to command operation of engine 28.

ECU 60 and engine controller 48 may be electrically coupled to throttle sensor 47 to receive one or more output signals THL. Output signal THL corresponds to one or more throttle operating parameters, including, but not limited to, throttle position, throttle application rate, and acceleration of throttle application. For illustrative purposes, the throttle ramp rate control system according to the embodiments discussed below will act in response to receipt of an output signal THL corresponding to throttle position. However, it will be appreciated that the invention is not limited to the ECU 60 receiving signals from throttle sensor 47, and that the invention can be practiced by ECU 60 receiving signals from any component that is capable of detecting the desired fueling or throttle rate of engine 28, such as engine controller 48.

Figure 3:
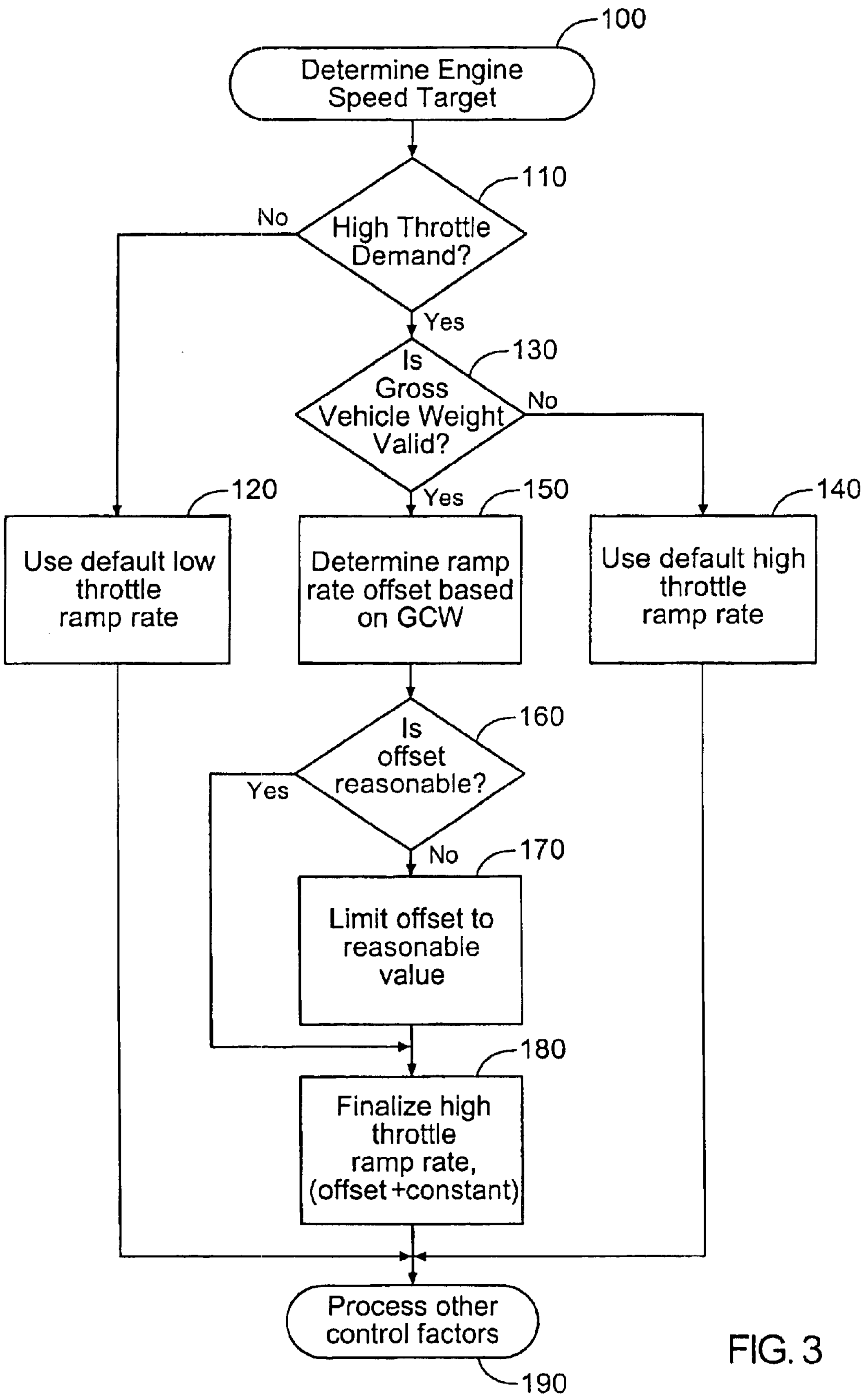
FIG. 3 is a flow chart depicting the steps taken in the adjustment of a throttle ramp rate for an engine of a vehicle.

Application of the throttle ramp rate control system will now be explained with reference to the flow chart of FIG. 3. The first step 100 involves determining a target engine speed ($ES_T$) that engine 28 should be operating at depending on one or more parameters, including the current fueling or throttle rate. As indicated previously, ECU 60 receives a signal THL from throttle sensor 47, the signal, in this embodiment, representing throttle position. Based on characteristic maps of preferred engine fueling routines programmed into ECU 60 and/or engine controller 48, a predetermined target engine speed ($ES_T$) that corresponds to the indicated throttle position is obtained.

The next determination, as illustrated in option box 110, is whether a high throttle demand is present during the launch of a vehicle. For purposes of this application, a vehicle launch occurs when clutch 30 is moved from a disengaged state to an engaged state, resulting in the accelerated movement of a vehicle that initially was stationary or traveling at near-zero velocity. In the present embodiment, the assessment of whether a high throttle demand is present is made by ECU 60. Specifically, ECU 60 monitors signal THL that is output by throttle sensor 47 and which corresponds to throttle position. When the position of the throttle surpasses a predetermined point, ECU 60 considers a high throttle demand to be present. For illustrative purposes, consider the following example where the throttle is controlled by the acceleration pedal of a vehicle. Once a driver depresses the acceleration pedal past a certain point, which corresponds to a certain percentage of total possible pedal movement, for example 90%, ECU 60 considers a high throttle demand to exist.

If a high throttle demand is not present, engine 28 is not expected to quickly reach a high engine speed (ES). Accordingly, the rate at which the engine ramps up, or the rate at which engine speed (ES) reaches a target speed ($ES_T$), need not be that high. As a result, the throttle ramp rate control system, as depicted in box 120, applies a default or predetermined low throttle ramp rate to engine 28.

Alternatively, if a high throttle demand is present, engine 28 is expected to quickly reach a high target engine speed ($ES_T$). In this circumstance, the throttle ramp rate control system will attempt to modify a default high throttle ramp rate based on the vehicle's weight. If only the weight of the vehicle is taken into account, an estimate of gross vehicle weight (GVW) may be appropriate. However, if the vehicle is a heavy duty truck or the like, which may include a trailer, then the appropriate weight to consider is the gross combined weight (GCW), which takes into account both the GVW and the weight of the trailer. For the remainder of the discussion, it will be assumed that the weight of a vehicle is properly represented by its gross combined weight (GCW).

The GCW can be estimated by various direct or indirect methods. For example, one method of directly estimating GCW is through the use of sensors incorporated into the vehicle. Alternatively, GCW may be indirectly estimated through mathematical derivation. Automated vehicle systems using GCW as a control parameter and/or having logic for determining GCW may be seen, for example, by reference to U.S. Pat. Nos. 5,490,063 and 5,491,630, the disclosures of which are incorporated herein by reference in their entirety. As described in these references, data such as vehicle acceleration is monitored, and then through multiple reiterations of the mathematical formula, a value for mass, which corresponds to GCW, can be derived. The system can be designed so that the mathematical derivation process may be performed by ECU 60, or alternatively, by another vehicle component possessing the computational capability. For example, AutoShift™ transmission systems by Eaton® Corporation possess the ability to estimate the weight of a vehicle. Accordingly, if the present invention is incorporated into a vehicle that utilizes an AutoShift™ transmission, the throttle ramp rate control system may retrieve the GCW data from the AutoShift™ system. For the remainder of this discussion, it will be assumed that GCW is estimated by mathematical derivation.

If GCW is estimated by mathematical derivation, it may be necessary to verify or validate the data to assure that it is reasonably accurate. This is because multiple stages of data may need to be collected and multiple reiterations of the deriving mathematical formula carried out. For example, it may require on the order of fifty ("50") calculations before a reasonably accurate estimate of GCW is obtained, and each calculation may require new vehicle operating data before it can be carried out. Further, it may be that vehicle operating data can be obtained only during certain times or during certain actions, such as when the transmission 22 is shifted from a lower to higher gear. As a result, a reasonably accurate estimate of GCW may not be available until a certain amount of time has passed or until the transmission 22 has shifted through a certain number of gears.

To assure that a reasonably accurate estimate of GCW is obtained, the throttle ramp rate control system verifies or validates the estimated GCW at step 130 by confirming that either enough time has passed or a sufficient number of appropriate actions have occurred in order for the required number of calculations to be carried out. If a vehicle is in a launch state and there is a high throttle demand, but the estimated GCW cannot be validated at 130 for the reasons noted above, then the system applies a default high throttle ramp rate (see step140) to engine 28.

If an estimated GCW can be obtained and validated at 130, the system continues on to step 150 and, based upon preprogrammed logic rules, determines the appropriate throttle ramp rate to apply taking into account the weight of the vehicle (GCW). The new throttle ramp rate, adjusted for the weight of the vehicle (GCW), is then expressed as an amount of offset that must be added or subtracted to the default high throttle ramp rate. Consider the following example, provided for illustrative purposes, where it is assumed that the default high throttle ramp rate is 100 rpm/sec. A truck incorporating the throttle ramp rate control system according to the present embodiment normally weighs 18,000 lbs., but upon being loaded, weighs 70,000 lbs. Upon validating an estimated weight of the truck, the system determines that a high throttle ramp rate of 130 rpm/sec is appropriate, and that the default ramp rate of 100 rpm/sec needs to be supplemented with an offset of 30 rpm/sec.

Before the adjustment to the default ramp rate is finalized, the system undergoes an error checking process. Specifically, at step 160, a determination is made on whether the calculated amount of offset falls within a predetermined range. This predetermined range is defined by empirically decided first and second maximum offset values that correspond, respectively, to the maximum amounts that the default high ramp rate can be increased by, for example, +50 rpm/sec, or reduced by, for example, −50 rpm/sec.

If the calculated amount of offset falls within the allowable range, it is considered reasonable. The high throttle ramp rate is then adjusted accordingly at step 180 by adding the offset to the default ramp rate. The system may then pass on the adjusted high throttle ramp rate to other vehicle systems at step 190 for further processing and implementation.

If the calculated amount of offset falls outside the allowable range, it is set to be equal to the closer of the two empirically determined maximum offset values. For illustrative purposes, consider an example where the ramp rate offset is calculated to be +60 rpm/sec, but the allowable offset range is between −50 rpm/sec and +50 rpm/sec. Upon such a determination, the calculated offset value is set at step 170 to be equal to the closer of the two maximum offset values. Thus, the previously calculated offset value of +60 rpm/sec would be reduced to +50 rpm/sec. The high throttle ramp rate is then adjusted accordingly as previously described. In this manner, the system assures that damage will not occur due to an attempt to generate a high throttle ramp rate that is either too small or too great in value.

Figure 4:
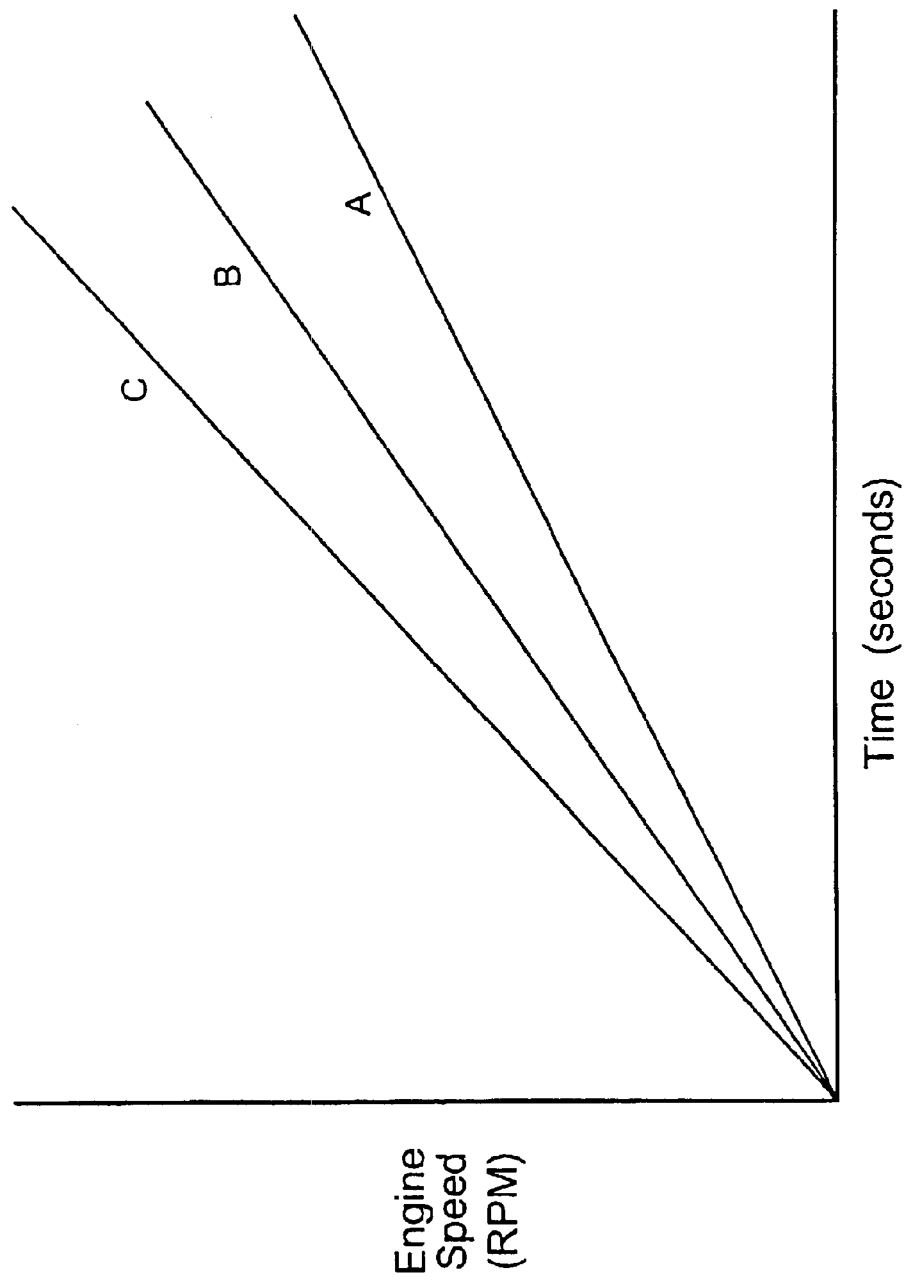
FIG. 4 is a graph depicting an example of the type of throttle ramp rates available according to an embodiment of the invention.

Unlike conventional vehicles that rely on a single default high throttle ramp rate, the system of the present invention, as described above, allows for a high throttle ramp rate to be adjusted based on the weight (GCW) of the vehicle. This adjustability allows the system to obtain any one of a multitude of high throttle ramp rates. This is further demonstrated in FIG. 4, which depicts a graph of engine speed over time. For illustrative purposes, assume line B of FIG. 4 represents the ramp rate of conventional systems, or alternatively, the default ramp rate of the present embodiment. By then determining and applying an offset value to the default ramp rate, an adjusted ramp rate of lower value (line A) or higher value (line C) may be obtained.

Figure 5:
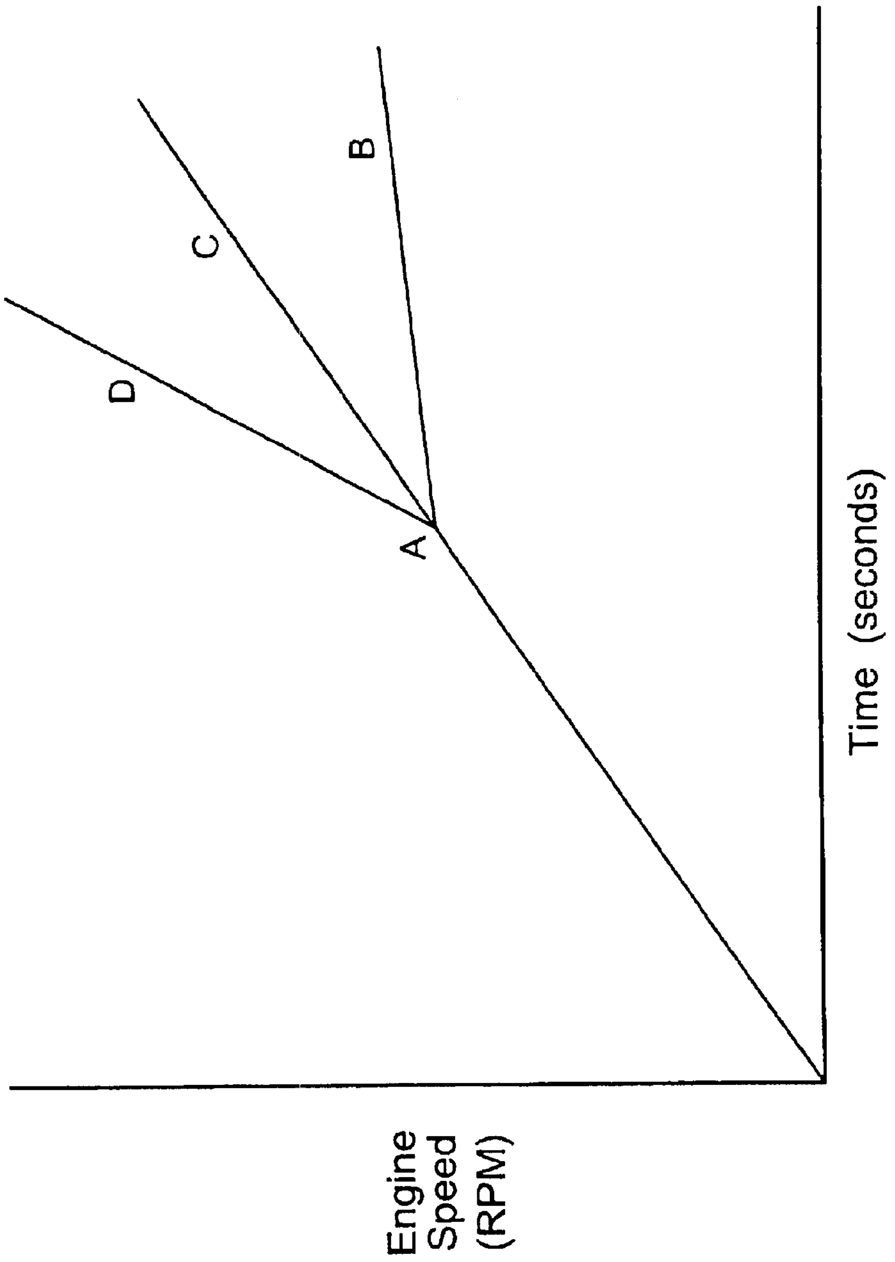
FIG. 5 is a graph depicting an example of the type of throttle ramp rates available according to another embodiment of the invention.

According to a further embodiment of the invention, adjustments based on an estimated weight of the vehicle (GCW) are made to the default high throttle ramp rate only when the state of the vehicle approaches near or reaches a predefined point in the clutch engagement process. According to the current embodiment, this predefined point is set at or near what is known as the "touch point", which represents the moment at which clutch 30 begins to engage, and thus transmit torque. As further emphasized in the graph of FIG. 5, the default high throttle ramp rate is applied without adjustment until the state of the vehicle approaches or comes reasonably close to approaching the "touch point", represented by point A. At that time, acceleration of engine 28 can continue on at the current rate (C), or proceed at a lesser ramp rate (B) or greater ramp rate (D) by addition of the calculated offset to the default ramp rate. This allows for advantages such as quicker initiation of vehicle acceleration by allowing a higher ramp rate to be applied for a portion of time, but then apply a slower, adjusted ramp rate once clutch engagement begins. This reduces the chance of a difficult vehicle launch, along with the possibility of damage due to overly rapid acceleration of engine 28.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A method of controlling fueling of an engine during a vehicle launch, comprising the steps of:

determining whether there is a high throttle demand upon said engine;

calculating a throttle ramp rate offset based on an estimated weight of said vehicle when said high throttle demand is present;

adjusting a default high throttle ramp rate based upon said calculated throttle ramp rate offset;

checking whether said calculated throttle ramp rate offset is reasonable; and correcting said calculated throttle ramp rate offset if determined to be unreasonable.

2. The method according to claim 1, wherein said step of checking whether said calculated throttle ramp rate offset is reasonable includes comparing said calculated throttle ramp rate offset to at least one predetermined offset value.

3. A method of controlling fueling of an engine during a vehicle launch, comprising the steps of:

determining whether there is a high throttle demand upon said engine;

calculating a throttle ramp rate offset based on an estimated weight of said vehicle when said high throttle demand is present;

validating said estimated vehicle weight; and adjusting a default high throttle ramp rate based upon said calculated throttle ramp rate offset;

wherein said step of calculating said throttle ramp rate offset is performed if said estimated vehicle weight is determined to be valid.

4. The method according to claim 3, wherein said estimated vehicle weight is held to be valid after a predetermined number of reiterative calculations of said estimated vehicle weight are performed.

5. The method according to claim 4, wherein vehicle data required for said reiterative calculations of said estimated vehicle weight is obtained when a transmission of said vehicle shifts from a lower gear to a higher gear.

6. A system of controlling fueling of an engine during a vehicle launch, comprising:

(a) an engine;

(b) a transmission system;

(c) a clutch connecting said engine to said transmission system;

(d) a throttle sensor for monitoring one or more throttle operating parameters;

(f) a control unit, in communication with at least said throttle sensor and said engine, for detecting a high throttle demand and obtaining an estimated weight of said vehicle;

wherein upon detecting said high throttle demand, said control unit adjusts a default high throttle ramp rate based upon said estimated weight of said vehicle; and wherein said control unit delays adjusting said default high throttle ramp rate until said clutch approaches a predefined operating state.

7. The system according to claim 6, wherein said predefined operating state is when said clutch begins to transmit torque.

8. A system of controlling fueling of an engine during a vehicle launch, comprising:

(a) an engine;

(b) a transmission system;

(c) a clutch connecting said engine to said transmission system;

(d) a throttle sensor for monitoring one or more throttle operating parameters; and (f) a control unit, in communication with at least said throttle sensor and said engine, for detecting a high throttle demand and obtaining an estimated weight of said vehicle;

wherein upon detecting said high throttle demand, said control unit adjusts a default high throttle ramp rate based upon said estimated weight of said vehicle; and wherein said clutch is a centrifugal frictional clutch.

9. A system of controlling fueling of an engine during a vehicle launch, comprising:

(a) an engine;

(b) a transmission system;

(c) a clutch connecting said engine to said transmission system;

(d) a throttle sensor for monitoring one or more throttle operating parameters; and (f) a control unit, in communication with at least said throttle sensor and said engine, for detecting a high throttle demand and obtaining an estimated weight of said vehicle;

wherein upon detecting said high throttle demand, said control unit adjusts a default high throttle ramp rate based upon said estimated weight of said vehicle; and wherein said clutch is a frictional position-controlled clutch.

* * * * *